United States Patent

Gueldenpfenning et al.

[15] 3,702,380

[45] Nov. 7, 1972

[54] QUEUE FOR ELECTRONIC TELEPHONE EXCHANGE

[72] Inventors: Klaus Gueldenpfenning, Penfield; Uwe A. Pommerening; Stanley L. Russell, both of Webster, all of N.Y.

[73] Assignee: Stromberg-Carlson Corporation, Rochester, N.Y.

[22] Filed: Jan. 21, 1971

[21] Appl. No.: 108,380

[52] U.S. Cl. ....................179/27.0

[51] Int. Cl. ....................H04q 3/64

[58] Field of Search ...179/15 AS, 18 FF, 27 B, 27 D; 340/172.5, 413

[56] References Cited

UNITED STATES PATENTS

| | | | |
|---|---|---|---|
| 3,271,521 | 9/1966 | Von Sanden | 179/15 AT |
| 3,581,016 | 5/1971 | Martinelli | 179/15 AT |
| 3,424,868 | 1/1969 | Saal | 179/15 AS |
| 3,466,398 | 9/1969 | Fraser | 179/15 AS |
| 3,328,772 | 6/1967 | Oeters | 340/172.5 |
| 3,560,655 | 2/1971 | Lucas | 179/18 FF |
| 3,430,001 | 2/1969 | Gianola | 179/18 FF |

*Primary Examiner*—Kathleen H. Claffy
*Assistant Examiner*—David L. Stewart
*Attorney*—Hoffman Stone and Charles C. Krawczyk

[57] ABSTRACT

The identifying number of the trunk circuit and a mark are stored in a set of recirculating stores such as in the queue when the trunk circuit is seized in response to an incoming call. If the queue is empty and an operator is available, the queue directs the call to an operator loop. If all of the operators are busy, the number and mark are stored until one is available. The trunks are served in the same sequence in which their numbers are entered in the registers. Each time the trunk scanner of the common control finds a marked trunk, its identifying number is compared with the stored numbers. If a match is not found and the queue is not already full, the trunk number and mark are entered at the end of the queue. If the marked trunk matches the first marked number in the stores, and an operator is available, the queue signals the common control to serve the marked trunk and erases the corresponding mark in the queue. First in, first out is ensured by running the stores through a complete cycle on each operation. An output display drive circuit is included to provide a visible indication of the number of calls in the queue at any time.

6 Claims, 8 Drawing Figures

INVENTORS
KLAUS GUELDENPFENNIG
UWE A. POMMERENING
STANLEY L. RUSSELL
BY
ATTORNEY

INVENTORS
KLAUS GUELDENPFENNIG
UWE A. POMMERENING
BY STANLEY L. RUSSELL

Hoffman Stone
ATTORNEY

FIG. 7

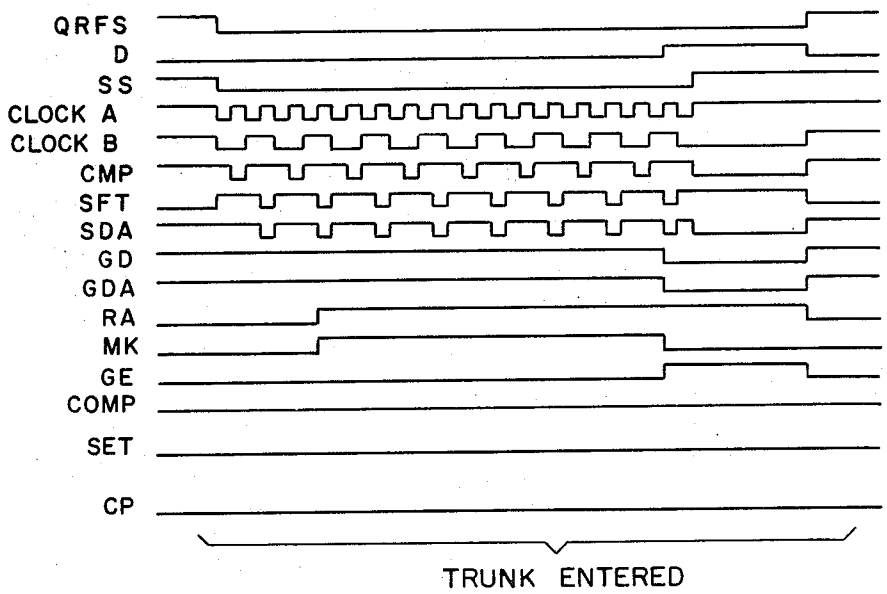

| TRK. NO. COMPARISON | MARK | WORD POSITION AT OUTPUT 1ST | INTER. | nTH | ACTION |
|---|---|---|---|---|---|
| YES | YES | YES | — | — | GRFS * RESET MARK |
| YES | YES | — | YES | — | INHIBIT WRITE |
| YES | YES | — | — | YES | |
| YES | NO | YES | — | — | WRITE AT STEP 9 |
| YES | NO | — | YES | — | |
| YES | NO | — | — | YES | |
| NO | YES | YES | — | — | CASE A |
| NO | YES | — | YES | — | NO ACTION (OTHER TRK) |
| NO | YES | — | — | YES | |
| NO | NO | YES | — | — | WRITE AT STEP 9 |
| NO | NO | — | YES | — | |
| NO | NO | — | — | YES | |

* SEE CASE B

CASE A

1. TRUNK ENTERED INTO QUEUE
2. TRUNK WAITS
3. TRUNK DROPS OUT BEFORE IT IS SERVED
4. CANCEL TRUNK MARK IN QUEUE

CASE B

SAME AS * BUT ALL OPERATORS BUSY. SEND GRFS TO GENERATE CALL WAITING BUT DO NOT ERASE MARK.

FIG. 3

INVENTORS
KLAUS GUELDENPFENNIG
UWE A. POMMERENING
STANLEY L. RUSSELL
BY
Hoffman Stone
ATTORNEY

INVENTORS
KLAUS GUELDENPFENNIG
UWE A. POMMERENING
BY STANLEY L. RUSSELL

Hoffman Stone
ATTORNEY

INVENTORS
KLAUS GUELDENPFENNIG
UWE A. POMMERENING
BY STANLEY L. RUSSELL

Hoffman Stone
ATTORNEY

INVENTORS
KLAUS GUELDENPFENNIG
UWE A. POMMERENING
BY STANLEY L. RUSSELL
ATTORNEY

INVENTORS
KLAUS GUELDENPFENNIG
UWE A. POMMERENING
BY STANLEY L. RUSSELL
Hoffman Stone
ATTORNEY

QUEUE FOR ELECTRONIC TELEPHONE EXCHANGE

BRIEF DESCRIPTION

This invention relates to a queue for an electronic telephone exchange of the type having a common control and a clock for timing operation of various components of the common control, and, more particularly, to a novel queue of relatively simple and inexpensive construction including fail-safe operating principles.

The queue of the invention includes a set of recirculating stores such as shift registers for storing trunk circuit identifying numbers and marks, a comparator for comparing stored numbers with the identifying numbers of marked trunks found by the trunk scanner, and logic circuitry for controlling the stores and generating desired output signals in response to indications received from the comparator and from the common control.

The basic functions of the queue are performed in duplicate and the results of the duplicate operations are compared. So long as the duplicated results are in agreement, the queue remains in service. If a discrepancy occurs, an alarm signal is produced and the queue is switched out of service automatically.

A queue display is also included for providing a continuous indication of the number of calls in the queue.

DETAILED DESCRIPTION

A presently preferred embodiment of the invention will now be described in connection with the accompanying drawings, wherein:

FIG. 3 is a chart indicating the functions of the logic portion of the queue;

Figure 4A:
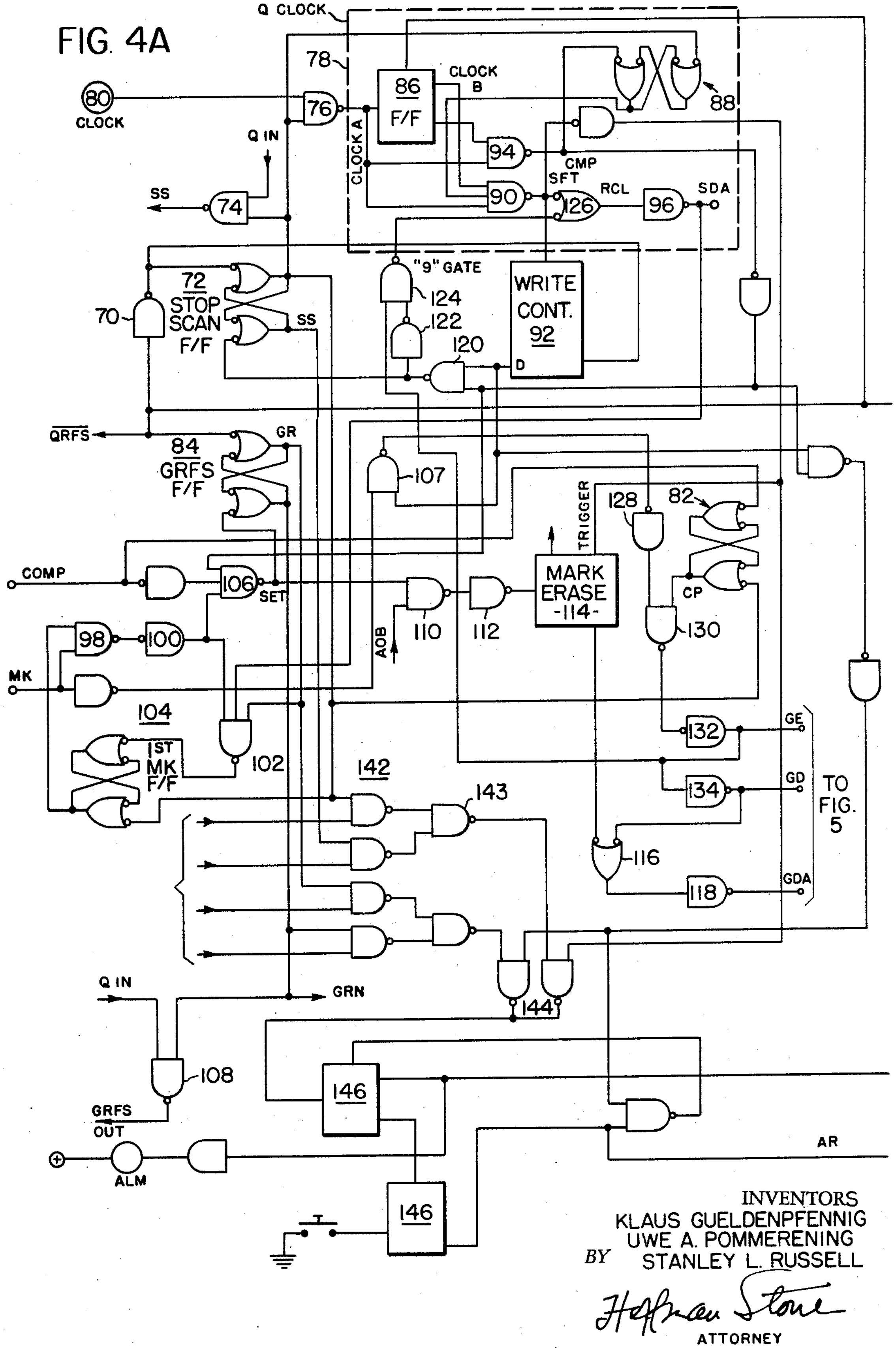
Figure 4B:
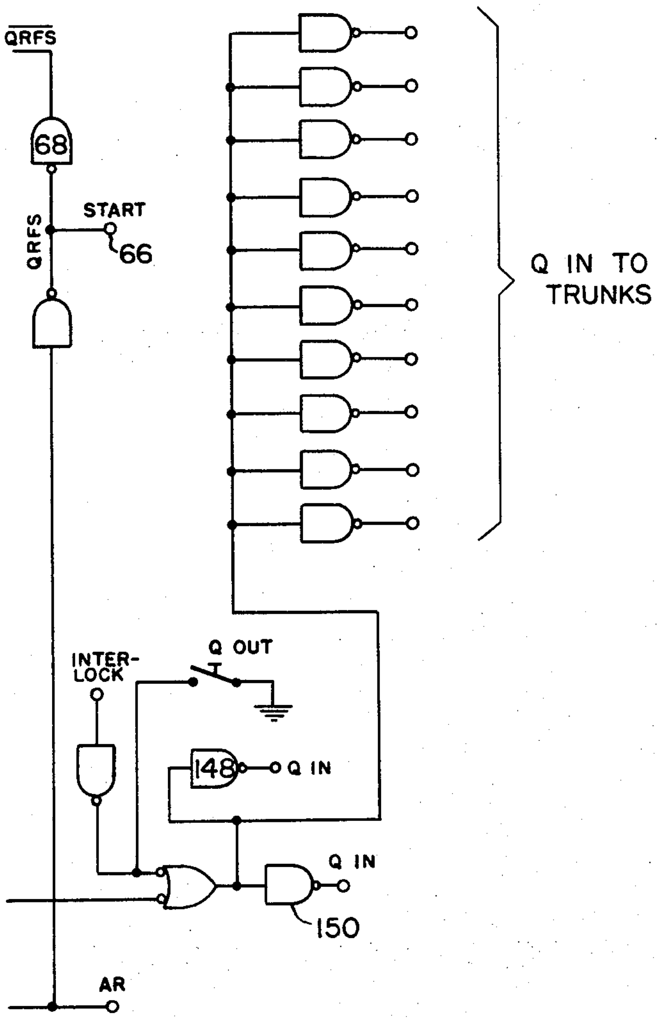
Figure 5:
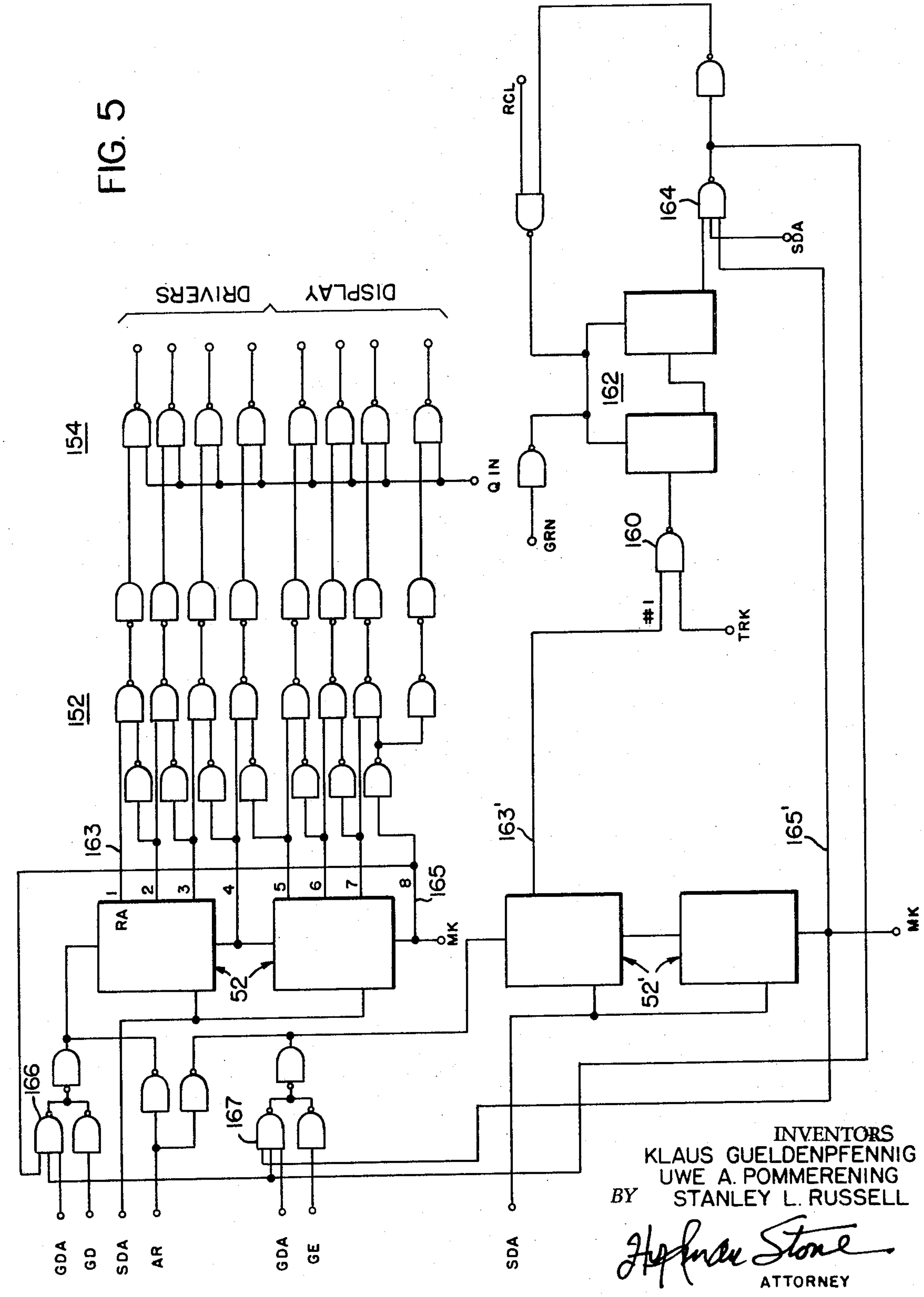
Figure 6:
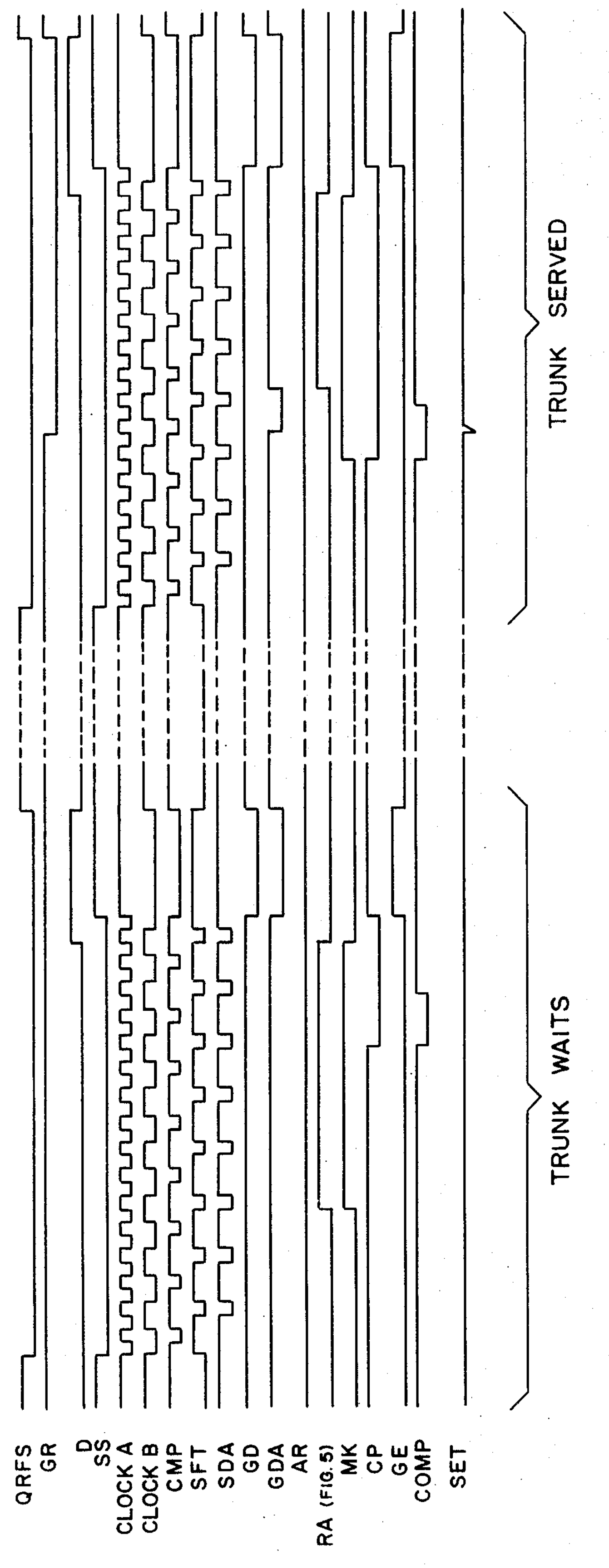

FIGS. 4A and 4B, juxtaposed with FIG. 4B on the right, are a schematic diagram of the logic, or control portion of the queue;

FIG. 5 is a schematic diagram of the mark registers, including circuitry, for producing continuous output signals indicating the number of calls in the queue; and FIGS. 6 and 7 are timing charts showing the voltage variations at certain referenced points of the logic circuit under various different operating circumstances.

Figure 1:
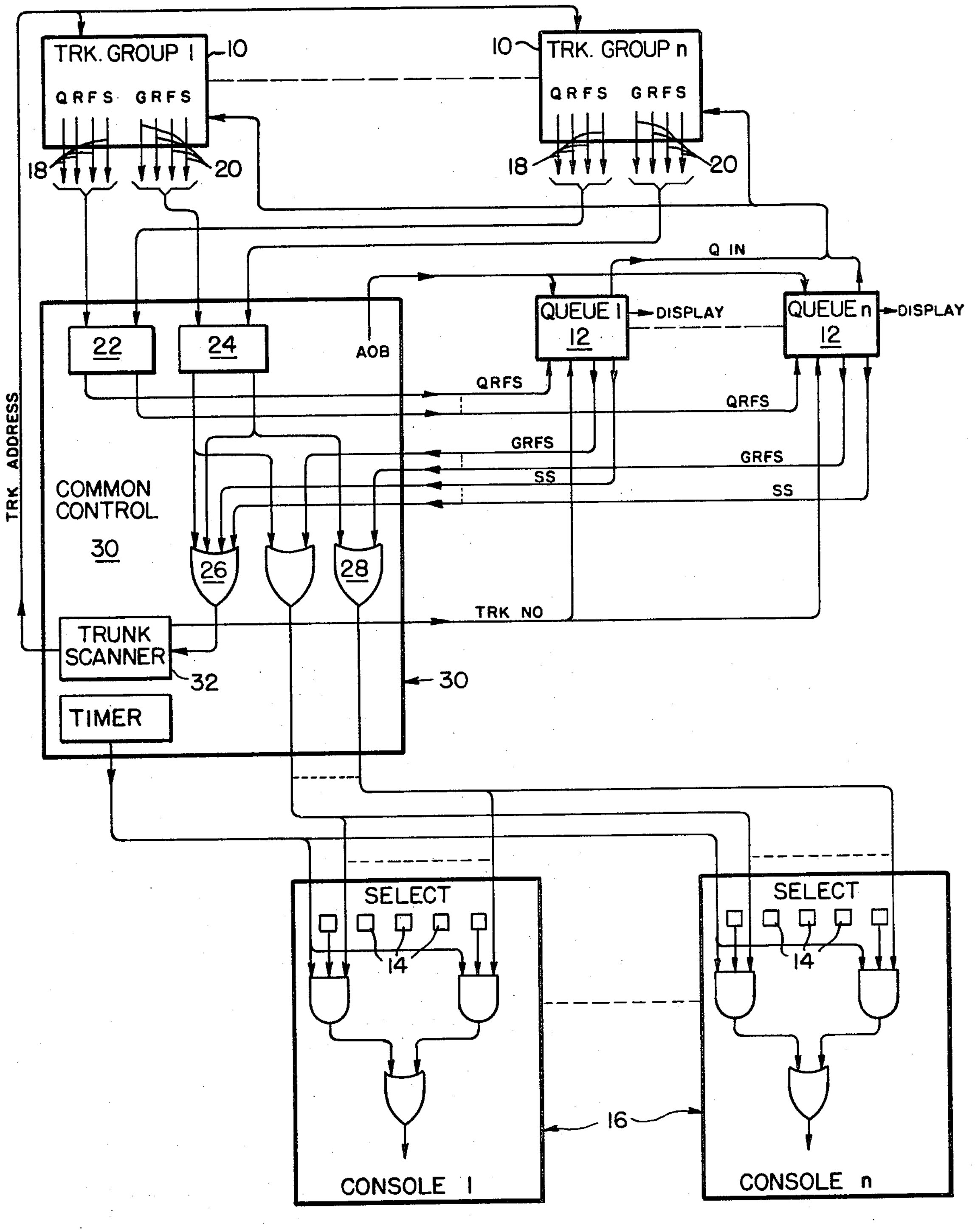
FIG. 1 is a schematic diagram of so much of the overall electronic exchange as relates to the operation of the queue of the invention, showing how the queue is connected to serve it.

The general arrangement of the queue relative to the other components of the telephone exchange is shown in FIG. 1. As shown, the trunk circuits 10 are arranged in groups in accordance with service requirements, and a separate queue 12 is provided for each group of trunks. Select keys 14 are included at the operator's consoles 16 to permit each operator to select the particular group of trunks to be served by her. The queues 12 are all identical to each other, each serving its own group of trunk circuits.

Each trunk circuit 10 is arranged to produce a mark on one of two leads 18 and 20, respectively, in response to the arrival of an incoming call. While the queue is in service, the trunks produce marks denoted QRFS (queue request for service) on the leads 18 that are extended through a QRFS strap field 22 in the common control 30 to the queue 12. When the queue 12 is out of service, the trunks mark the GRFS (general request for service) leads 20, which are extended through a GRFS strap field 24 and OR gates 26 and 28 to the trunk scanner 32 and the operator consoles 16.

All incoming calls are routed through the queue 12 so long as it continues to function properly. If it develops a malfunction, it generates an alarm signal and causes the trunk circuits 10 to generate GRFS marks instead of the normal QRFS marks, and the queue is bypassed.

Figure 2:
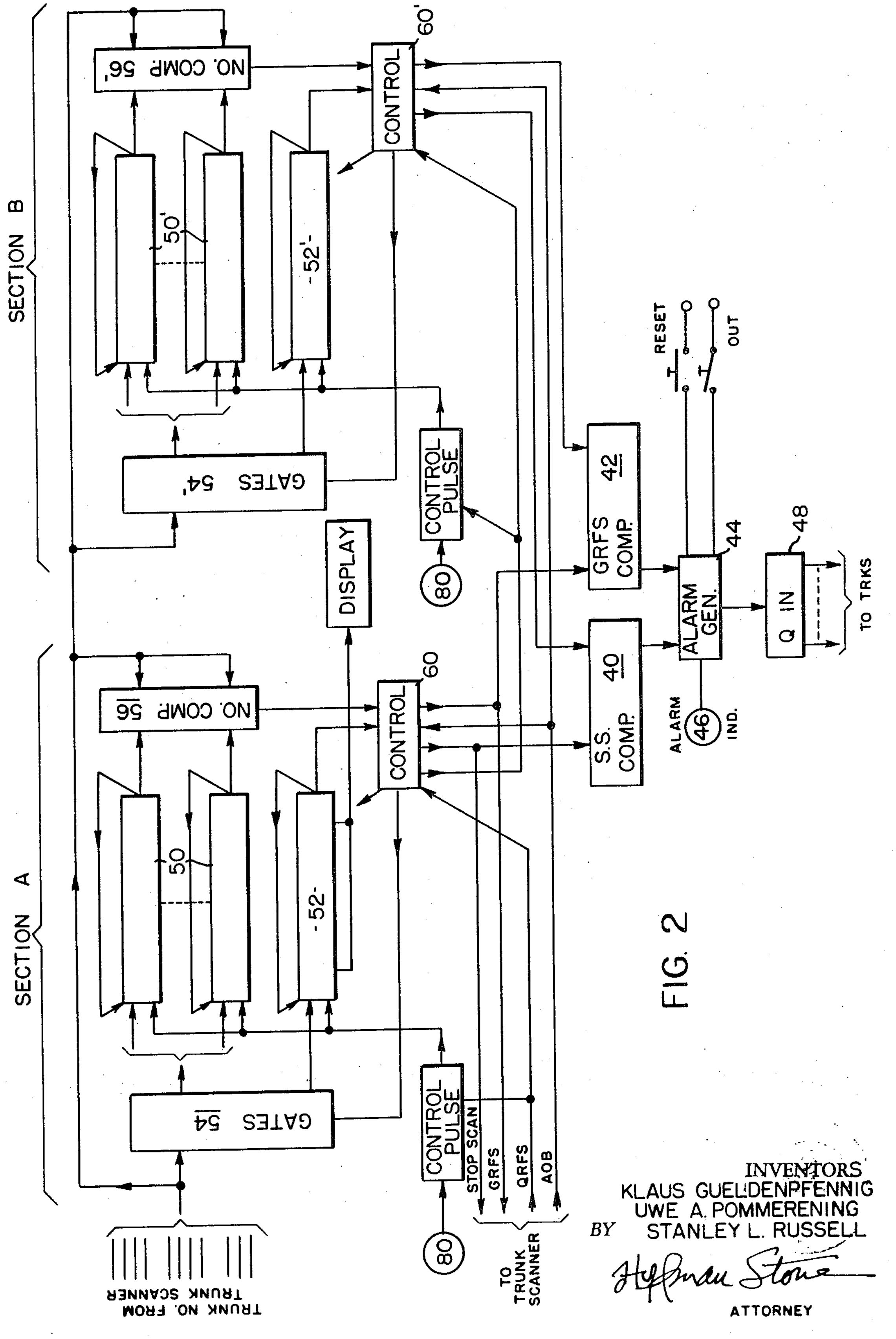
FIG. 2 is a block diagram of a queue according to the presently preferred embodiment of the invention.

The queue 12 is shown in block diagram form in FIG. 2. It includes first and second sections A and B, which are exact duplicates of each other and operate in parallel. Their outputs are compared by comparators 40 and 42, and if they are not in perfect agreement, an output signal generated by either of the comparators 40 and 42 triggers an alarm circuit 44, which energizes an alarm indicator 46 and inhibits the Q IN signal, which is normally applied to the trunk circuits from the Q IN circuit 48. When the Q IN signal is inhibited, the trunk circuits served by the queue revert to generating GRFS marks when they are seized, and the queue is bypassed.

The heart of the queue 12, referring only to section A by way of example, is a set of re-circulating shift registers 50 and 52 for storing the identifying numbers of the marked trunks and the marks in the order in which the marked trunks are first found by the trunk scanner 32 (FIG. 1). The identifying numbers are available from the common control in the form of binary coded decimal (BCD) signals, and, typically, eleven registers 50 are needed for the identifying numbers and one register 52 for the marks.

A trunk remains marked until it is served and an erase signal sent to it. If there is an appreciable delay in service, and a particular trunk remains in the queue 12 for an appreciable interval, it will be picked up by the scanner 32 many times while the call is waiting for service. When the trunk scanner 32 finds a marked trunk, the identifying number of the trunk and the mark are applied at the input gates 54 of the shift registers 50 and 52 and also to one set of input terminals of the number comparator 56. The first time the scanner 32 finds the marked trunk, the shift registers 50 and 52 are stepped through their complete cycle, typically eight steps (more if a larger queue capacity is desired) and no identity is found by the comparator 56. The input gates 54 are then enabled on the next succeeding clock pulse and the trunk number and mark are inserted at the end of the line in the registers 50 and 52, respectively, provided the queue was not already full.

When the trunk is next found by the scanner 32, the same procedure is initiated, but the comparator 56 finds an identity between the found trunk member and mark and the number and mark previously entered in the shift registers. The queue control 60 then holds the gates 54 inhibited and releases the scanner at the end of the comparison cycle.

If the identity signal from the comparator 56 occurs simultaneously with the first appearance of a mark at the output of the mark register 52, the queue control 60 sends a GRFS signal to the common control 30. If the common control is able to and does satisfy the GRFS signal, the queue control 60 erases the mark from the mark register 52 at the end of the cycle, and the common control sends an erase signal to the trunk circuit, causing it to erase its QRFS mark. If the GRFS signal from the queue control 60 is not satisfied, the comparison cycle is completed and the scanner released, leaving the mark in the mark register so the call will retain its proper place in line.

The logic circuit of the queue control 60 is shown in FIGS. 4A and 4B, and its functions charted in FIG. 3. In addition, timing diagrams showing the voltage variations at various different points in the logic circuit are shown in FIGS. 6 and 7.

The logic circuit includes an interlocking arrangement of gates, flip-flops, and a counter. The logic is in duplicate, and the duplicate results are compared with each other in an alarm comparator section shown in the lower part of FIG. 4A. If the results agree, a Q IN signal is produced and applied to the trunk circuits. If the results do not agree, the Q IN signal is inhibited, and the trunk circuits switch over to produce GRFS marks when they are seized instead of the QRFS marks. The common control is arranged to produce a STOP-SCAN signal in response to GRFS marks, but not to QRFS marks.

The logic operates in response to reception of a QRFS mark, first to produce a STOP-SCAN signal for application to the trunk scanner 32 in the common control to cause the trunk scanner to stop on the marked trunk. It then proceeds to carry out the comparisons and take the proper action. The sequence starts with the appearance of the QRFS mark at the START terminal 66. The mark is applied through gates 68 and 70 to set a STOP-SCAN flip-flop 72. The output of the STOP-SCAN flip-flop 72 is applied through a gate 74 to the STOP-SCAN input terminal of the trunk scanner 32 in the common control; through a gate 76 to enable the queue clock 78 by admitting timing pulses from the system clock 80; and to a comparison flip-flop 82 to enable it. The QRFS signal also partially enables a GRFS flip-flop 84, and enables a divide-by-two flip-flop 86, the output of which consists of clock pulses at one-half the rate of the system clock 80. The output of the STOP-SCAN flip-flop 72 enables the clock input gate 76 and a delay flip-flop 88, which later normally inhibits a gate 90 at one output of the divide-by-to flip-flop 86.

The QRFS signal is also applied from the gate 68 to enable a count-of-eight counter 92 called the WRITE control, which produces an output signal after the next succeeding eight clock pulses from the gate 90 at the output of the divide-by-two flip-flop 86.

The delay flip-flop 88, when enabled by the STOP-SCAN flip-flop 72, pulses in accordance with the half-rate clock signal from the divide-by-two counter 86 taken through a gate 94 at the second output of the flip-flop 86, and operates in conjunction with the system clock 80 and the divide-by-two flip-flop 86, all of which are ANDed at the gate 90, to drive a register driver gate 96, the output of which is distributed to the registers 50 and 52 to step them.

When the first mark appears at the output of the mark register 52, it is applied through AND gates 98 and 100, and a control AND gate 102 to set a FIRST MARK flip-flop 104, which thereupon inhibits the first AND gate 98 and renders the control insensitive to marks appearing subsequently from the mark register 52. The first mark is also applied from the output of the AND gate 100 to one input of a SET AND gate 106, the other inputs of which are the outputs of the comparator 56 and of the divide-by-two flip-flop 88. If the comparator 56 indicates an identity simultaneously with the occurrence of the first mark, the GRFS flip-flop is set in response to the output of the SET gate 106, and directs a GRFS signal to the common control through an AND gate 108.

The output of the SET AND gate 106 is also fed through AND gates 110 and 112 to set a mark erase flip-flop 114 unless an all operators busy (AOB) signal is present at the second input to the AND gate 110. The output of the mark erase flip-flop 114, taken through an OR gate 116 and an AND gate 118, inhibits the recirculation gate 166 (FIG. 5) of the mark register 52 during the next register drive pulse, thereby erasing the mark from the register. The trunk member is recirculated until its place is taken by another trunk number. Thus, if an operator is available, the mark will be erased, and, if none is available, it will be kept in the mark register 52 to be served when the trunk is next found by the trunk scanner.

If no comparison is found by the comparator 56, and the queue is not full, the registers are driven one step beyond their capacity and the trunk number and mark are inserted into them. The extra step is driven in response to the WRITE control counter 92, which, once enabled in response to the QRFS signal, counts the divide-by-two clock pulses and produces an output signal following the eighth pulse, occurring one basic clock pulse after the end of the eighth register driver pulse. The output of the WRITE counter is applied to the registers 50 and 52 through AND gates 120, 122, and 124, an OR gate 126, and the AND gate 96. It persists as indicated by the curve SDA (FIG. 6) until the queue is reset in response to discontinuance of the QRFS signal.

The trunk number and mark are written into the registers 50 and 52 in response to the outputs of the WRITE counter 92 taken through AND gates 126, 128, 130, and 132, and 134, the output of the final gate 134 being also applied through the OR gate 116 and the AND gate 118 to write the mark in the mark register 52.

The output of the WRITE control counter is also applied through the AND gate 120 to reset the STOP-SCAN flip-flop 72, thus to release the trunk scanner 32.

As noted in FIG. 3, the circuit is arranged to respond to two special sets of conditions not listed in the logic chart itself. The first case arises when a calling party disconnects while his call is in the queue awaiting service. It is then necessary to erase the mark for the discontinued call from the mark register 52. The second case arises when the comparator 56 indicates an identity coincident with the first mark from the mark register 52, but all operators are busy. It is desired in this case to generate a GRFS signal to cause the common control to produce a call waiting signal, but the mark must be reentered into the mark register 52, and not erased. This is accomplished, as hereinabove described, by inhibiting the gate 110 responsively to the all operators busy signal, thereby to prevent triggering of the mark erase flip-flop 114.

To handle the first case and also to avoid entering a new call in the queue when the queue is already full, which would otherwise erase the number first in line, the condition of one of the mark registers 52 and 52' is monitored by a divide-by-two counter 162 (FIG. 5). A mark for the last position in the queue is stored in the first stage 163 and 163' of the registers 52 and 52', and a mark for the first position in the last stage, 165 and 165'. The output of the first stage of the register is applied through one input of an AND gate 160 to the input of the counter 162. The AND gate 160 is normally inhibited. It is enabled by a signal from the trunk scanner 32 once during each cycle of the scanner 32 at a time when the scanner 32 is not resting on a trunk circuit. The counter 162 is advanced one count on each trunk scan whenever a call is in the queue, as indicated by the presence of a mark in the first stage of the register 52 or 52'.

When the counter 162 reaches the count of two it produces an output signal partially to enable a gate 164. The second input to the gate 164 is the output of last stage 165 or 165' of the register, and the third input is a clock signal from the gate 96 in the queue clock generator (FIG. 4A).

The marks are written into the registers 52 and 52' at the first stage 163 and 163', and when the queue is full, the mark first entered has advanced to the last stage 165 and 165'. If the queue is not full, no mark is stored in the last stage. When, now, the counter 162 reaches the count of two, and there is a mark in the last stage of the register, an output signal is applied on the next following clock pulse from the gate 164 to the recirculation gates 166 and 167 of the mark registers to inhibit them during the first register drive pulse of the next comparison, thereby to erase the first mark in the registers 52 and 52'. The counter is then reset immediately following the first driver pulse and before the occurrence of the second driver pulse by a clock signal from the terminal designated RCL at the output of the OR gate 126 in the clock generator (FIG. 4A) to prevent erasure of marks following the first one.

The action occurs only when the comparators 56 and 56' have failed to find an identity during two successive trunk scans between a marked trunk circuit and the number stored in the last stages of the trunk number registers 50 and 50', thus indicating that the trunk circuit corresponding to the number in the first position in the queue is no longer marked. This limitation is imposed on the circuit by resetting the counter 162 in response to each GRFS mark generated by the GRFS flip-flop 84 (FIG. 4A). As described hereinabove, the GRFS flip-flop is triggered every time a number identity is found coincidentally with the first mark to appear from the mark registers 52 and 52'.

It is also desired to inhibit writing of newly found marked trunk members when the queue is full. This is done by inhibiting the so-called "nine" gate 124 if a mark appears in the last stage 165 or 165' of the mark register at the eighth step. The "nine" gate 124 is normally held partially enabled by the output of the first data control gate 132, and remains partially enabled during the last register drive pulse unless a mark appears. If a mark appears in response to the last driver pulse, it is fed through the gate 106 along with the output of the counter 92, and through gates 128, 130, and 132 to inhibit the "nine" gate 124 and thus block transmission of the ninth driver pulse to the registers, and also to inhibit the input gates 54 (FIG. 2) to the registers.

The logic as described is duplicated in an exactly similar circuit (not shown in connection with FIGS. 4A and 4B) and the results of the duplication are compared by comparison gates 142, 143, and 144, and flip-flops 146 to produce an alarm output signal if the results of the duplication are not in complete agreement. The alarm signal operates to inhibit the Q IN signal, acting through output gates 148 and 150.

As shown in FIG. 5, an array 152 of gates is connected to sense the outputs of one of the mark registers 52 and 52', and to produce an output signal indicating the total number of marks stored in the register during the intervals between comparisons. The gates in the array 152 are arranged in a cascade sequence. If only one mark is in the register, only the first row of gates produces an output signal, and the "one" output amplifier is enabled. If there are two marks, the output of the second stage of the register enables the "two" amplifier, and also inhibits the gate connected to the first stage. Marks in the following stages successively inhibit the gates connected to the respective preceeding stages.

What is claimed is:

1. A queue circuit for a telephone exchange of the kind having a common control including a trunk scanner and a clock for timing its operations, the queue circuit being operative to hold incoming calls in ordered sequence and to relay them in sequence to an operator's position as one becomes available, wherein the improvement comprises:
   a. a set of re-circulating stores for storing trunk number identifying signals,
   b. a mark re-circulating store for storing signals indicating trunk marks,
   c. gate means for feeding signals into said stores,
   d. detecting means responsive to operation of the trunk scanner for detecting marked trunk circuits,
   e. a comparator for comparing the number of a marked trunk detected by said detecting means with signals stored in said set of stores, and
   f. control means responsive to said detecting means and said comparator for driving said stores and said gate means and for selectively inserting signals into said stores and erasing signals stored in said mark stores.

2. A queue circuit for a telephone exchange of the kind having a common control including a trunk scanner and a clock for timing its operations, the queue circuit being operative to hold incoming calls in ordered sequence and to relay them in sequence to an operator's position as one becomes available, wherein the improvement comprises:
   a. a set of re-circulating stores for storing trunk number identifying signals,
   b. a mark re-circulating store for storing signals indicating trunk marks,
   c. gate means for feeding signals into said stores,
   d. detecting means responsive to operation of the trunk scanner for detecting marked trunk circuits,
   e. a comparator for comparing the number of a marked trunk detected by said detecting means with signals stored in said set of stores, f. control means responsive to said detecting means and said comparator for driving said stores and said gate means and for selectively inserting signals into said stores and erasing signals stored in said mark store, and g. means for producing an output signal indicating the number of signals stored in said mark store.

3. A queue circuit according to claim 1 wherein said control means is a logic circuit including:

a. means for producing a series of drive signals equal in number to the number of stages in said stores, b. means for applying said drive signals to said stores to circulate signals stored in them and to cause the signals to appear in succession at the output stages of said stores, and c. means for producing a request-for-service signal if said comparator indicates an identity simultaneously with the first appearance of a signal at the output of said mark store.

4. A queue circuit according to claim 1 wherein said control means is a logic circuit including:

a. means for producing a series of drive signals equal in number to the number of stages in said stores, b. means for applying said drive signals to said stores to circulate signals stored in them and to cause the signals to appear in succession at the output stages of said stores, c. means for producing a supplemental drive signal after said series of drive signals if said comparator does not indicate an identity during said series of drive pulses, and d. means for inserting signals indicating a mark and the number of the detected trunk into said stores in response to a supplemental drive signal produced by said supplemental drive signal means.

5. A queue circuit according to claim 4, also including means for inhibiting said supplemental drive signal means whenever signals are present in all stages of said mark store.

6. A queue circuit according to claim 1 wherein said control means is a logic circuit including:

a. means for producing a series of drive signals equal in number to the number of stages in said stores, b. means for applying said drive signals to said stores to circulate signals stored in them and to cause the signals to appear in succession at the output stages of said stores, and c. means for erasing the first signal to appear at the output of said mark store if said comparator has not indicated an identity coincident with it during two consecutive cycles of the trunk scanner.

* * * * *

UNITED STATES PATENT OFFICE
CERTIFICATE OF CORRECTION

PATENT NO. : 3,702,380

DATED : November 7, 1972

INVENTOR(S) : Klaus Gueldenpfennig, et al.

It is certified that error appears in the above-identified patent and that said Letters Patent are hereby corrected as shown below:

Col. 2, line 56 "member" should read ---number---.

Col. 3, line 46 "to" should read ---two---.

Col. 4, line 19 "member" should read ---number---.

Signed and Sealed this

*twenty-first* Day of *October 1975*

[SEAL]

*Attest:*

RUTH C. MASON
*Attesting Officer*

C. MARSHALL DANN
*Commissioner of Patents and Trademarks*